(12) United States Patent
Underwood et al.

(10) Patent No.: US 12,567,249 B2
(45) Date of Patent: Mar. 3, 2026

(54) RECONFIGURABLE CROP SCANNING SYSTEM

(71) Applicant: Seeing Systems Pty Ltd, Hornsby (AU)

(72) Inventors: James Underwood, Hornsby (AU); Peter Morton, Hornsby (AU); Steve Scheding, Hornsby (AU)

(73) Assignee: Seeing Systems Pty Ltd, Hornsby (AU)

( * ) Notice: Subject to any disclaimer, the term of this patent is extended or adjusted under 35 U.S.C. 154(b) by 417 days.

(21) Appl. No.: 18/252,805

(22) PCT Filed: May 25, 2021

(86) PCT No.: PCT/AU2021/050490
§ 371 (c)(1),
(2) Date: May 12, 2023

(87) PCT Pub. No.: WO2022/036387
PCT Pub. Date: Feb. 24, 2022

(65) Prior Publication Data
US 2024/0029429 A1     Jan. 25, 2024

(30) Foreign Application Priority Data

Aug. 18, 2020     (AU) ................................ 2020902940

(51) Int. Cl.
*G06V 20/10*     (2022.01)
*G06V 20/56*     (2022.01)

(52) U.S. Cl.
CPC ............ *G06V 20/188* (2022.01); *G06V 20/56* (2022.01)

(58) Field of Classification Search
CPC ...... G06V 20/188; G06V 20/56; G06V 10/70; H04N 23/695; H04N 23/698;
(Continued)

(56) References Cited

U.S. PATENT DOCUMENTS 9,475,189 B2     10/2016     Kahani
2006/0213167 A1*     9/2006     Koselka ................. A01D 75/00
                                                            56/10.2 A
(Continued)

FOREIGN PATENT DOCUMENTS

KR     10-2016-0128594 A     11/2016
WO     2020/049575 A1     3/2020

OTHER PUBLICATIONS

International Search Report issued in corresponding International application No. PCT/AU2021/050490, mailed Jun. 25, 2021.
(Continued)

*Primary Examiner* — Stephen P Coleman
(74) *Attorney, Agent, or Firm* — Finch & Maloney PLLC

(57)     ABSTRACT
A scanning system for scanning crops is described, the system being arranged to be mounted to a vehicle and to be traversed along rows of crops, the system including: a carrier which is arranged to be mounted to a vehicle; a number of mountings for attaching items of scanning equipment to the carrier; and wherein at least some of the mountings may be adjusted to allow the scanning system to be reconfigured for use in different scanning scenarios.

14 Claims, 9 Drawing Sheets

(58) Field of Classification Search
CPC ... A01B 69/001; A01B 79/005; G01C 11/025;
G01S 17/89; G01S 19/14; A01G 7/00;
G05B 2219/45003; G01N 33/0098
USPC ......................................................... 382/110
See application file for complete search history.

(56)                           References Cited

U.S. PATENT DOCUMENTS

| | | |
|---|---|---|
| 2011/0022231 A1 | 1/2011 | Walker et al. |
| 2014/0285673 A1 | 9/2014 | Hundley et al. |
| 2015/0352721 A1 | 12/2015 | Wicks et al. |
| 2018/0025480 A1 | 1/2018 | Dingle et al. |
| 2019/0261565 A1 | 8/2019 | Robertson et al. |

OTHER PUBLICATIONS

Written Opinion issued in corresponding International application No. PCT/AU2021/050490, mailed mailed Jun. 25, 2021.
International Preliminary Report of Patentability issued in corresponding International application No. PCT/AU2021/050490, dated Aug. 26, 2022.
Supplementary European Search Report Corresponding to 21857030.7 mailed Oct. 16, 2024.

* cited by examiner

RECONFIGURABLE CROP SCANNING SYSTEM

TECHNICAL FIELD

The present invention relates to a reconfigurable system for use in scanning crops. It finds particular use in imaging based systems for analysing tree-crops to provide information which informs decisions regarding the management of those crops.

BACKGROUND TO THE INVENTION

When growing crops, decisions must be made as to the timing and nature of a wide range of crop growing activities from pruning or thinning to harvesting the crop. The decisions involved in managing growth of crops are numerous and include:

When, where and how to prune

When, where and how to thin flowers and fruitlets

When to harvest and how much labour to engage for the harvest.

Underlying these decisions is a desire to achieve a balance between expending resources on the crop such as labour, land area, and fertilizers to produce crops of high quality and with a high yield.

Crop growers look to various sources to inform their decisions regarding the management of their crops which include historical meteorological information, forecasted meteorological information, soil condition and information gathered from making visual inspections of the crop plants.

When inspecting crops which are grown over a very large area of land it is typically only feasible to inspect samples of the crop, rather than the entire crop. These inspections may be made at the edges of the crop or at selected locations within the area of the crop. Such sampling techniques are often based on the assumption that the crop is uniform over its area, which is usually not the case. As such, decisions taken based on the samples may not be optimal for the entire crop area.

It has been tried to inspect crops from an aircraft or other airborne vehicle flying over the crop and taking photographic images. However, this approach can only asses the very top facing part of the crop plants. With many types of crops, such as tree type crops, an aerial view can provide only very limited information as much of the crop volume is hidden from view by the tree canopy.

It has been tried to provide scanning equipment such as cameras and lidar scanners on a ground based vehicle and to cause the vehicle to drive along rows of a tree-crop to scan the crop. The data obtained by the scanning equipment is then later analysed to determine attributes of the crop which has been scanned.

However, there is a large variety of tree-crops, which vary in height, width, size and shape. Furthermore, there is a large variety of orchard architectures such as traditional separate plants, or trellises that may be vertical, angled or overhead. Furthermore, the features of the crop which are of interest may be found at varying heights in the plants of the crop. Some may be located high up in the plant, some may be located near to ground level, or a combination of these. Still further, the features of interest may vary over the life cycle of the crop plants. This means that a particular arrangement of scanning hardware which is suitable for use with one crop at one time of the year will be generally unsuitable for use with other types of crops or even the same crop at a different time of year. This requires numerous different scanning devices to be constructed, each of which is suitable for use with a particular type of crop, or for use at a particular time of year.

There remains a desire for new or improved systems and methods to scan crops to determine attributes of those crops.

SUMMARY OF THE INVENTION

In a first aspect the present invention provides a scanning system for scanning crops, the system being arranged to be mounted to a vehicle and to be traversed along rows of crops, the system including: a carrier which is arranged to be mounted to a vehicle; a number of mountings for attaching items of scanning equipment to the carrier; and wherein at least some of the mountings may be adjusted to allow the scanning system to be reconfigured for use in different scanning scenarios.

At least some of the mountings may be pivotally adjustable.

At least some of the mountings may further include an arm portion.

The arm portion may be interchangeable with another arm portion of a different length.

An item of scanning equipment may be positioned at various locations along the length of the arm portion.

At least some of the mountings may be able to be adjusted by moving them to different locations on the carrier.

The carrier may include an extension portion and at least some of the mountings are provided on the extension portion.

The extension portion may be deployed by rotating it with respect to the remainder of the carrier.

The extension portion may be deployable to enable items of scanning equipment to be located low to the ground in use.

The scanning system may further include a control system, wherein the control system adapts the operation of the sensing equipment to suit the different scanning scenarios.

The different scanning scenarios may include different crop types.

The different scanning scenarios may include different features of interest.

The control system may automatically adapt the operation of the scanning equipment.

The control system may adapt the operation of the scanning equipment based on the geographic location of the scanning system.

The control system may adapt the operation of the scanning equipment based on the current time of year.

The control system may adapt the operation of the scanning equipment based on determining a crop type based on the output of one or more of the items of scanning equipment.

The scanning system may further include at least one item of scanning equipment which may be any one of a camera, a lighting unit, a global positioning device or a lidar.

Embodiments of the invention provide modular hardware and software systems that enables operation in different crop types. The modular system has been designed to enable one system (i.e. one minimal set of equipment) to be used to service many different crop types efficiently, with minimal reconfiguration time required to switch between crop types.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
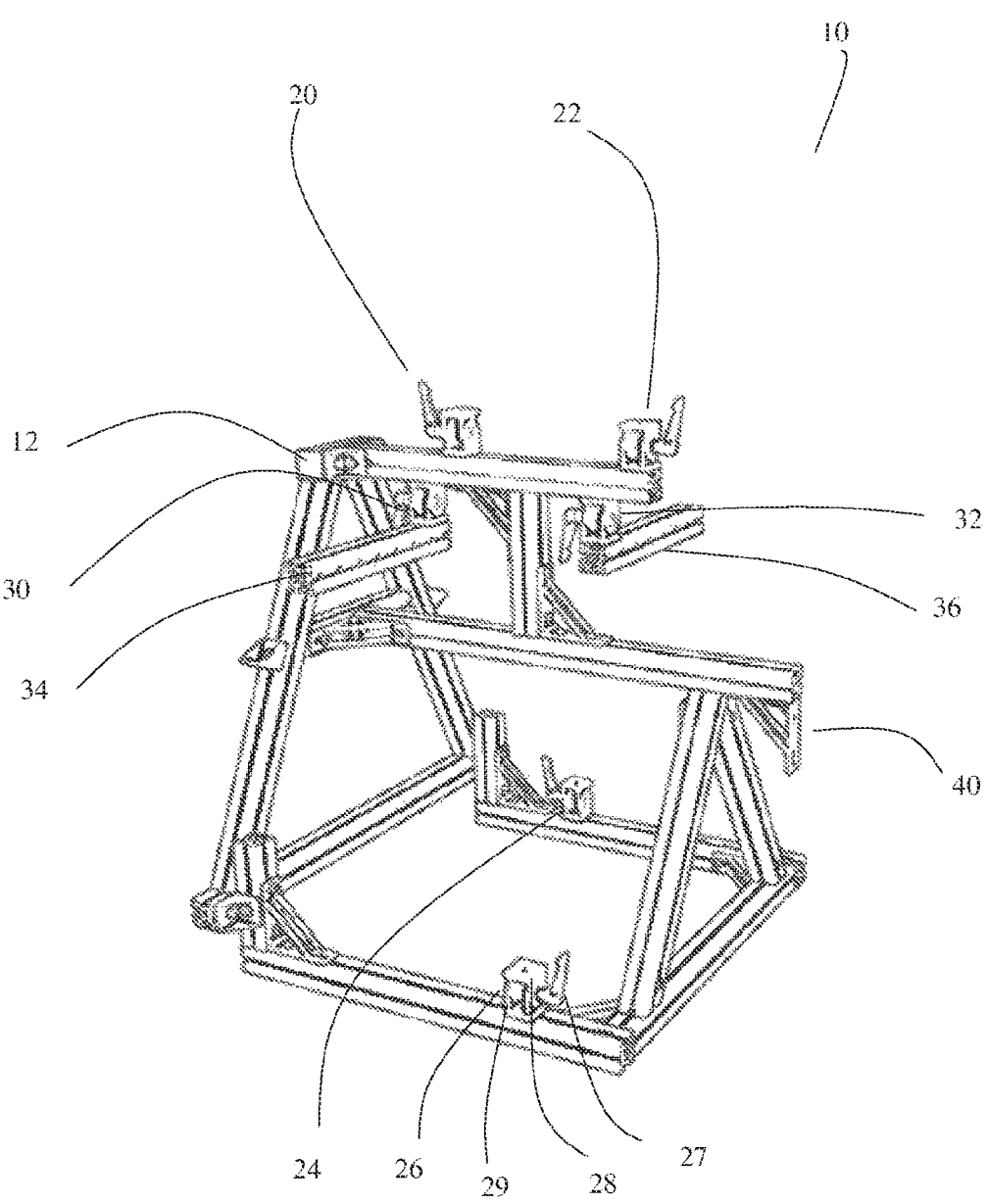
FIG. 1 is a perspective view of a scanning system according to an embodiment of the invention.

Referring FIG. 1, a scanning system 10 for scanning crops is shown, the system being arranged to be mounted to a vehicle and to be traversed along rows of crops. The system includes a carrier in the form of frame 12 which is arranged to be mounted to a vehicle. The frame 12 is formed by interconnecting lengths of extruded aluminium section using brackets and screw connectors. The sections have channels formed therein to allow for attachment of brackets to hold the sections together and to allow for attachment of various mountings for attaching items of crop scanning equipment to the frame 12 as will be described.

The system 10 includes a number of mountings 20, 22, 24, 26, 30, 32 and 40 for attaching items of scanning equipment. The mountings are adjustable to allow the scanning system to be reconfigured for use in different scanning scenarios.

The mountings are attached by way of screw fasteners to the channels provided in the frame sections. This allows for adjustment of the mountings by removing them and locating them at different locations on the frame.

Mountings 20, 22, 24, 30 and 32 are of a type which are pivotally adjustable to provide a tilt adjustment. With reference to mounting 26, each of these type of mounting include a fixed piece 29 which attaches to a channel in a frame member. A rotating piece 28 is pivotally attached to the fixed piece 29 by way of a threaded clamp lever 27. The rotating piece 28 includes a flat surface portion to which an item of scanning equipment can be mounted by way of screws or bolts. A tilt adjustment of the piece of scanning equipment can be achieved by loosening the clamp lever 27 changing the angular position of the rotating piece 28, and then re-tightening the clamp lever.

Mountings 30, 32 are of a type which further include arm portions in the form of channel sections 34, 36. These have been pre-drilled with holes along their length to enable items of scanning equipment to be positioned at various locations along the length of the sections, corresponding to the locations of the pre-drilled holes. The channel sections 34, 36 allow the position of an attached item of scanning equipment to be adjusted to be nearer to, or further away from, the crop being scanned as will be described.

System 10 enables mechanical attachment of items of crop scanning equipment, such as cameras, lighting modules and GPS or lidar modules to a mobile scanning platform. The frame 12 allows each component to be placed in the optimal position and orientation to achieve the optimal field of view subject to constraints. Constraints include maximising the extent and visibility of the crop, given the fields of view of the camera, light source and lidar, while minimising self-obstructions or self-occlusions of that field of view due to the vehicle, frame and components themselves (e.g. avoiding placing part of the frame or equipment such that it is visible within the sensor data, blocking a clear view of the crop). This is not trivial considering the sensors must have very wide fields of view to be able to see tall trees from within narrow access rows (e.g. >100 degrees for the cameras and 360 degrees for the lidar is required).

The frame is collapsible and can be flat-packed for transport and reassembled with simple tools and a simple process. This enables it to be transported in a compact form to remote locations, where it can be assembled on site.

Strike plating (not shown) can be attached to the frame to shield the equipment from branch strikes.

The system 10 is reconfigurable to allow operation with different crops which may have significantly different geometry, including different tree height; tree spacing; canopy architecture; row spacing; width of foliage; etc. These differences in geometry require the frame to support different placements and orientations of the scanning components, so that the constraints mentioned above (maximising visibility and minimising self-occlusions) can be met without the need for a different frame or different components for each crop type.

Figure 2:
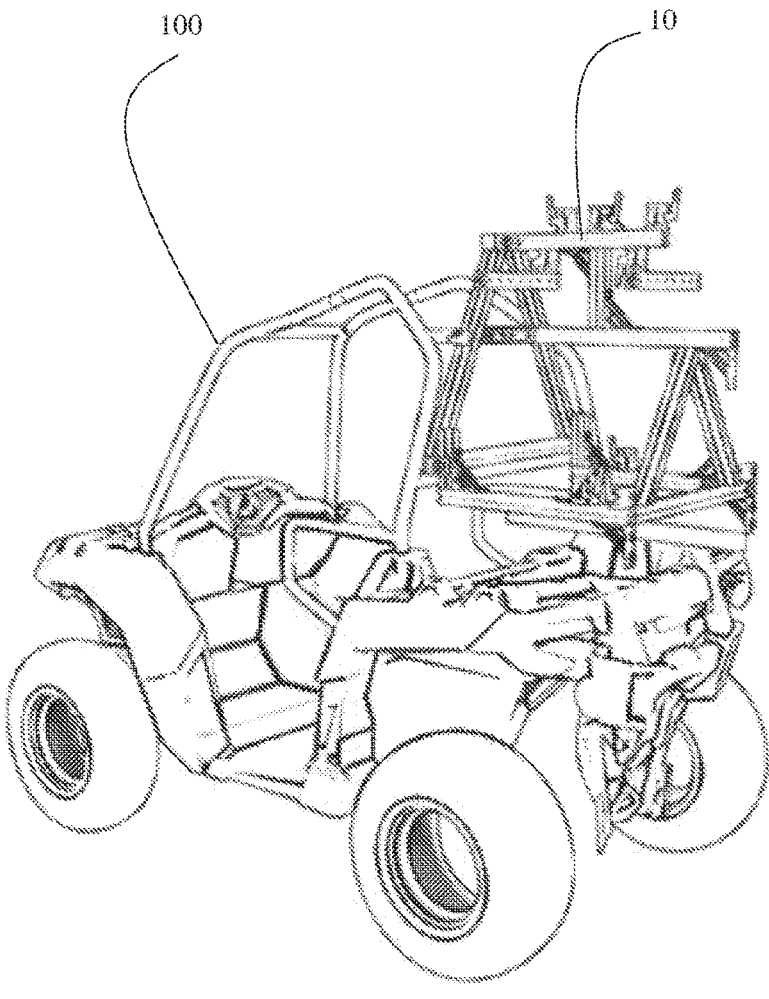
FIG. 2 shows the scanning system of FIG. 1 attached to the rear of an ATV.

Referring to FIG. 2, system 10 is shown mounted to the back of a vehicle in the form of an ATV. In FIG. 2, no scanning equipment is attached to the frame.

Figure 3:
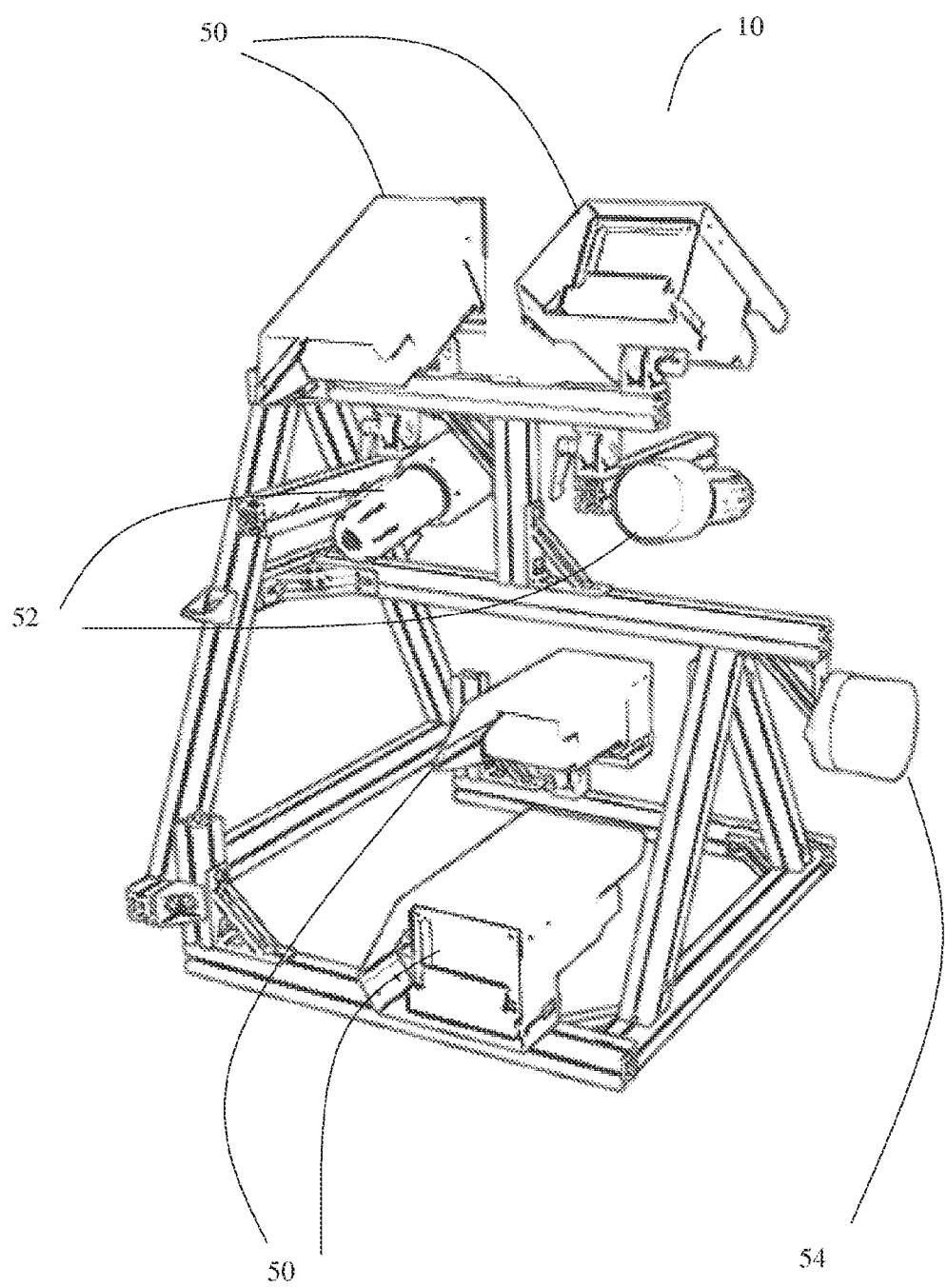
FIG. 3 shows the scanning system of FIG. 1 with items of scanning equipment attached.

Referring to FIG. 3, system 10 is shown with items of crop scanning equipment attached to frame 12. Lighting modules in the form of strobe lights 50 have been attached to mountings 20, 22, 24 and 26. Cameras have been attached to mountings 30 and 32. A lidar module has been attached to mounting 40.

A multi-constellation GNSS receiver (GPS, GLONASS, Galileo etc) (not shown) provides the primary source of localisation data for the scanner. The GNSS receiver may also incorporate an electronic compass, or may deduce its heading and orientation from differencing GNSS measurements as is known in the art.

A control system including a data logging computer (also not shown) also forms part of the scanning arrangement and is to be mounted to the ATV, secured within the frame. The data logging computer logs to a removable Solid-State Storage device (SSD). Batteries and integrated charger provide power to the system. The scanner also includes a communications module to provide an internet connection on the scanner to allow remote maintenance and over the wire updates. Control parameters and operating software for the scanning arrangement is also stored on the SSD.

To scan a crop, the ATV with scanning system mounted thereto is driven along the length of the rows of the crop in question. The data captured by the data logging computer is then subsequently analysed by a separate unit known as a processor. The processor is essentially an off-the-shelf computer with significant compute power (both CPU and GPU). Due to the quantity of data gathered by the scanner (up to 4 Tb per day), the processor is operated as an 'Edge' computer i.e. it is to be physically located near to where the scanning takes place. It would be currently infeasible (both cost and time) to send the data 'to the cloud', have it processed and be available to a grower within the time constraints needed by growers which could be in the afternoon for a morning scan, or the next morning.

The processor takes the removable SSD from the scanner as its input. Once inserted into the processor, the computer automatically backs up all scanner data, and automatically processes the raw data into a form useful for grower use-cases.

Key software modules/algorithms deployed on the processor include:

5

Simultaneous Localisation and Mapping (SLAM) allow-
ing LiDAR as an alternate or complimentary localisa-
tion source to GPS Training: the training algorithm is provided with sample
images which have been previously analysed by human
operators and labelled sub-images accordingly to iden-
tify features of interest in the images (i.e. images will
be labelled with examples of fruits, flowers, fruitlets, or
other formations which are of interest, depending upon
the particular type of crop that is being analysed).
Standard machine learning training methods are used to
build model for use in the Inferencing stage. This
model only needs to be built once per crop type and
may then be used indefinitely, or alternatively it can be
constantly updated to improve the overall performance
of Inferencing.

Inferencing: for each image, the algorithm identifies
objects that match the model built during the Training
phase. The outputs of this algorithm are the counts-
per-image of the desired feature (flowers, fruit) and
their locations within the images. Suitable inferencing
algorithms are known in the art and open source
algorithms are available.

Geometry: the processor will additionally process LiDAR
data to determine key tree metrics such as canopy
volume and density, tree height, light interception and
opportunities for pruning etc.

Georeferencing: the processor combines the localisation
data (from GPS or SLAM or both) with the detections
from the inferencing step, to produce the underlying
data in map form. It uses geometry to project from
where the images were taken out to where the actual
tree is. This can be done either by assuming the tree is
half the row width in front of the camera, or more
accurately by using LiDAR scene interpretation to
measure how far away the trees actually were. Addi-
tionally—the data is optionally divided into N different
height bands from low to high within the canopy. This
provides maps of the lower, middle and upper (e.g. if
N=3) canopy bands separately. Where LiDAR infor-
mation is combined with camera images the system
utilises highly accurate (sub millisecond) time synchro-
nisation between sensors (including between GPS,
cameras and LiDAR) to achieve the most accurate
relationships between the different data streams.

Build data product: This algorithm automatically gathers
the results from all the data processing algorithms and
converts them into a form suitable for delivery to
growers. The data product is a website that can be
served from the processor, from the cloud, or copied to
a removable storage device for direct delivery to a
grower. The data product is also provided in a simple
file format (e.g. CSV or other) that can be ingested by
arbitrary third party data management software (e.g.
GIS applications or otherwise).

The processor also includes a communications module to
provide an internet connection to allow remote maintenance
and over the wire updates.

The adjustability of the mountings allows the items of
crop scanning equipment to be repositioned and for their
orientation to be changed as required for different tree
heights or row spacings.

Figure 4:
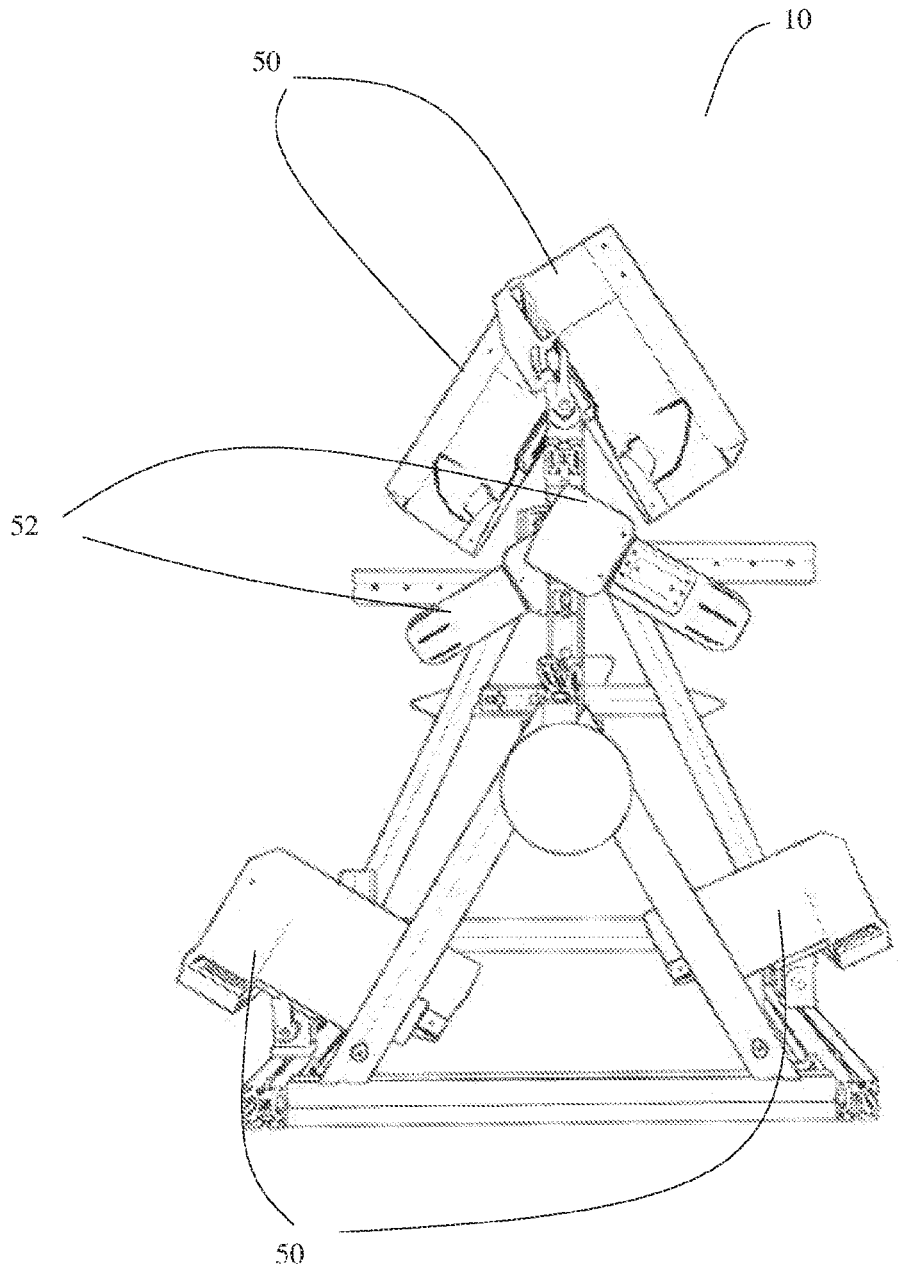
FIGS. 4 to 6 show the system of FIG. 3 reconfigured for different scanning scenarios.

Referring to FIG. 4, the arrangement shown in FIG. 3 has
been reconfigured for use with a tall crop such as almonds,
with cameras 50 and lights 52 pointing higher.

6

Figure 5:
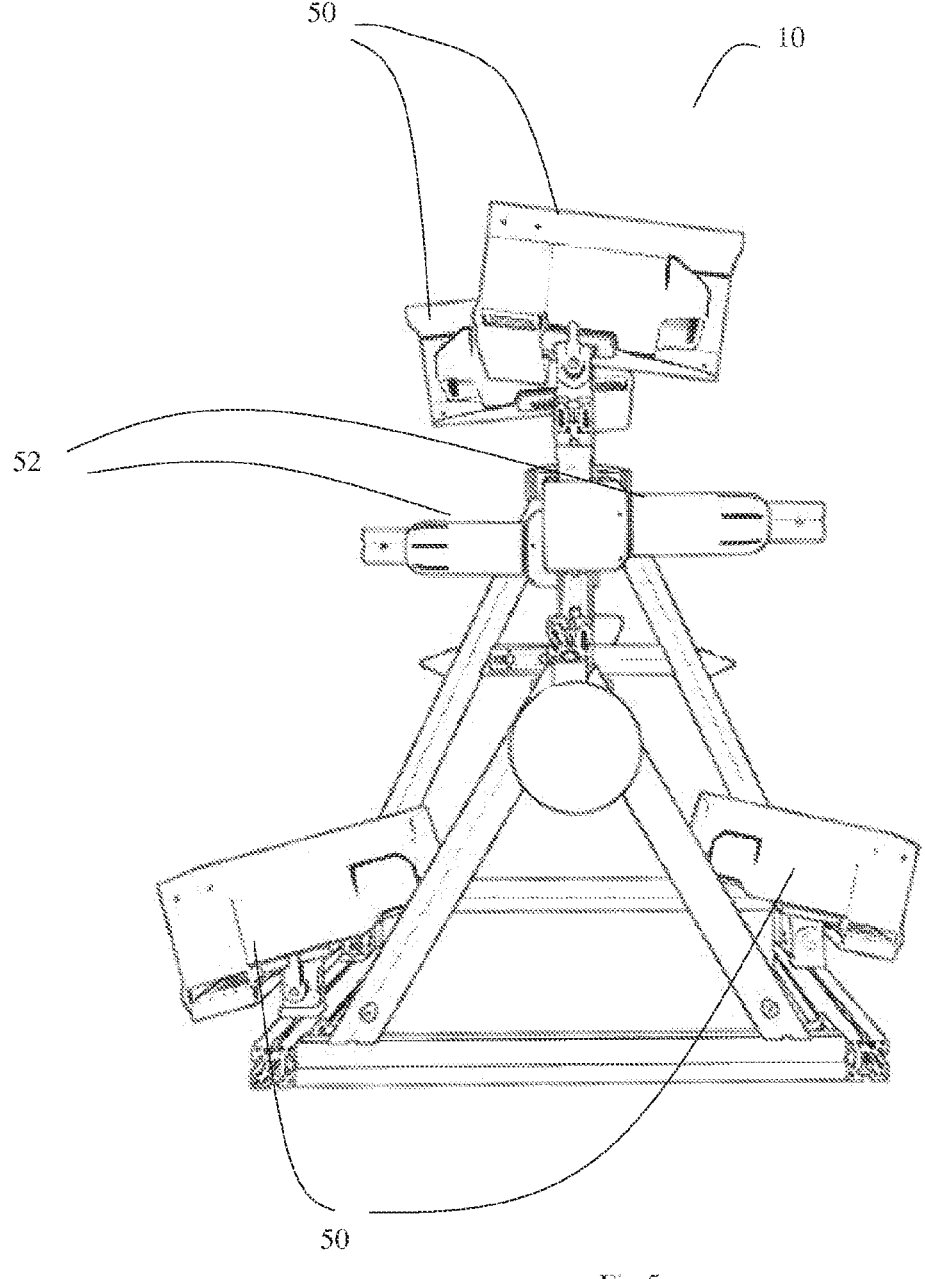
Figure 6:
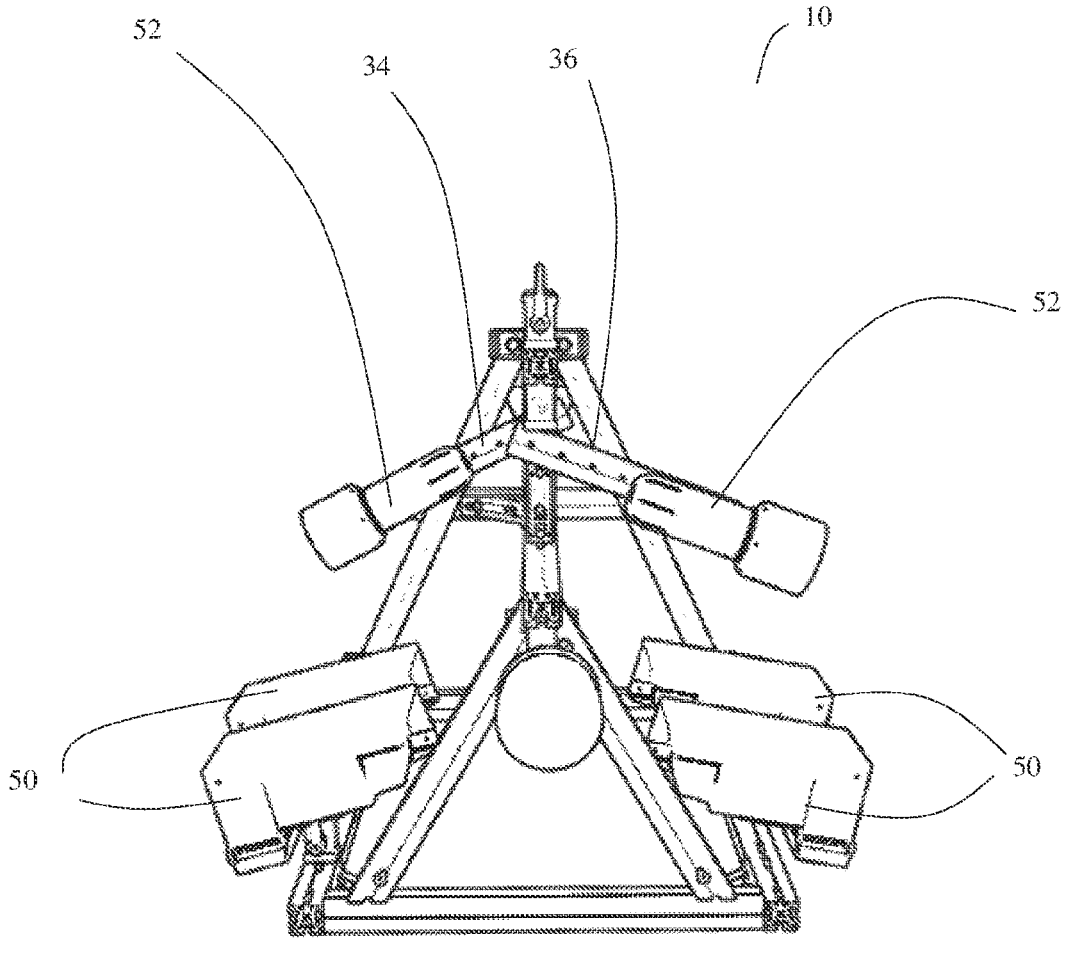

Referring to FIG. 5, the arrangement shown in FIG. 3 has
been reconfigured for use with a shorter crop such as
cherries, with cameras 50 and lights 52 pointing lower Referring to FIG. 6, the arrangement shown in FIG. 3 has
been reconfigured to adopt a downward looking configura-
tion appropriate for low crops, or for mapping the ground
beneath the tree as required for applications including map-
ping fruit or nuts fallen to the ground, or inspection of
ground-based infrastructure such as irrigation lines. Cam-
eras 52 are pointed downward and have been mounted
further outward along the arm sections 34, 36. This places
the cameras 52 wide of the centre-line of frame 12, in order
to see over the lower part of the frame and over the strobe
lights 50, preventing them from blocking the view. The
strobe lights 50 that were previously at the top of the frame
12 are repositioned next to the lower lights, to provide more
illumination low down where it is required for this configu-
ration. This configuration uses the identical set of parts as the
examples above.

Figure 7:
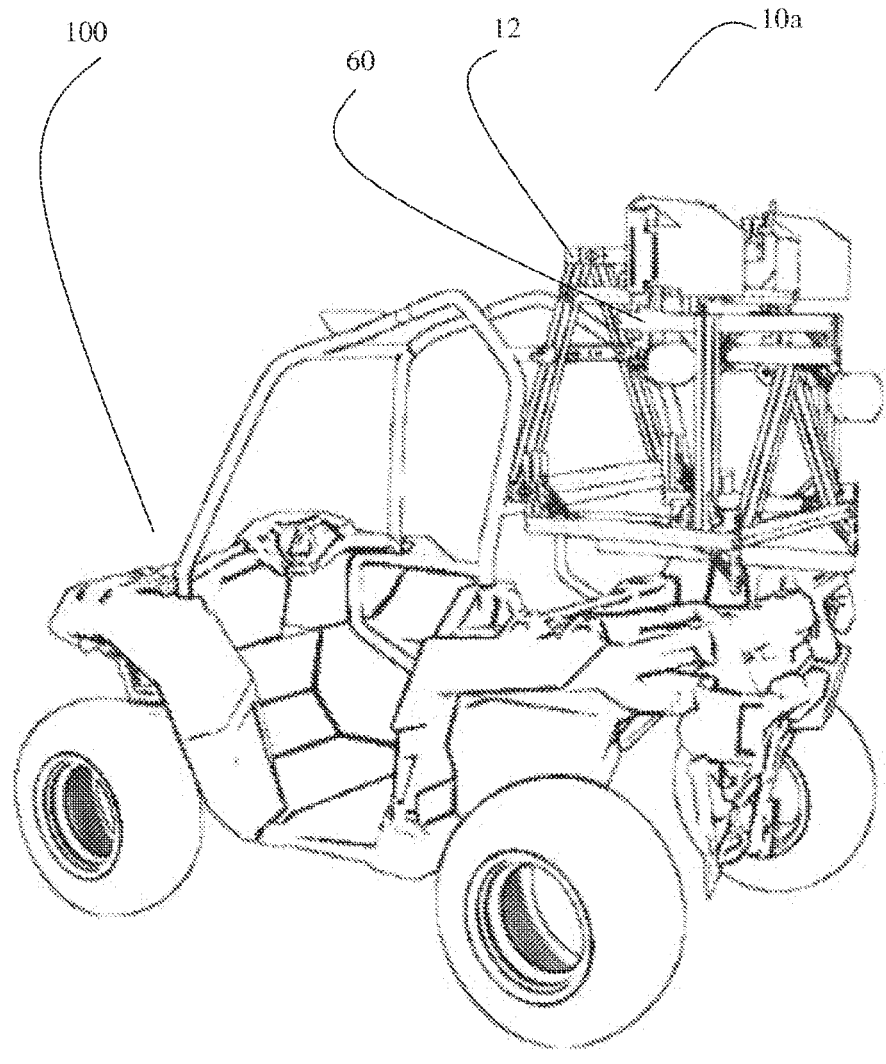
FIGS. 7 to 9 show a modified version of scanning system with a fold out frame extension.
Figure 8:
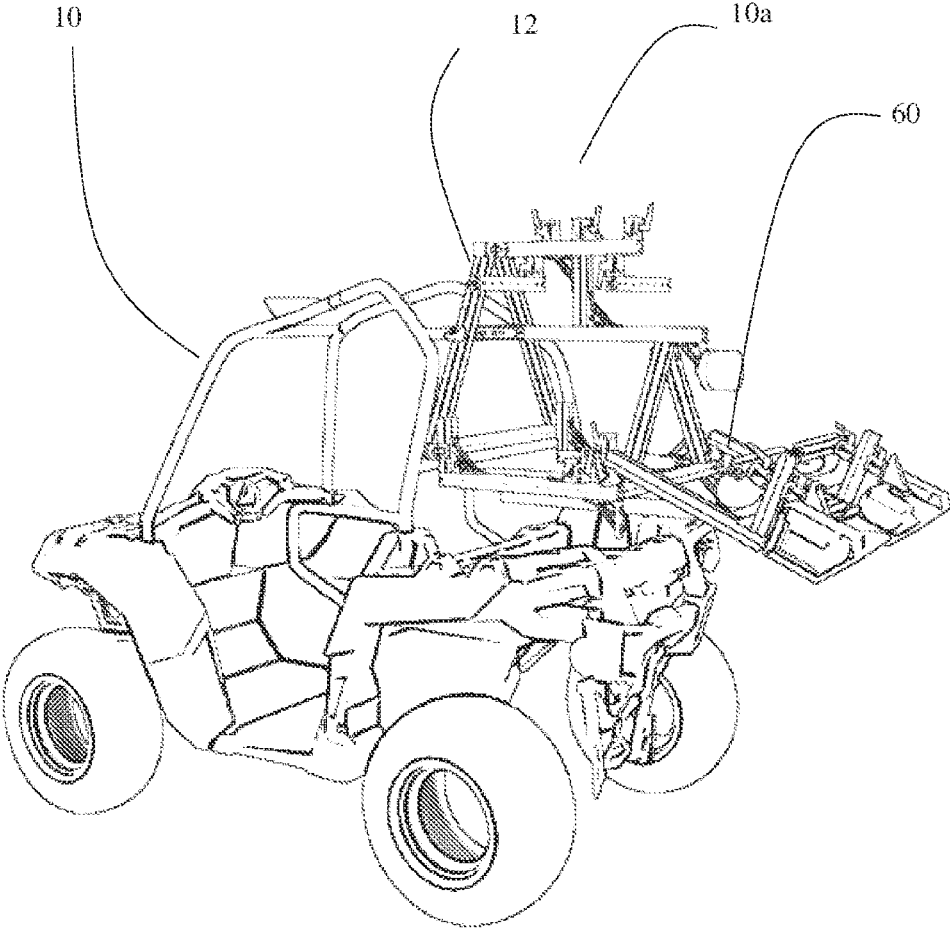
Figure 9:
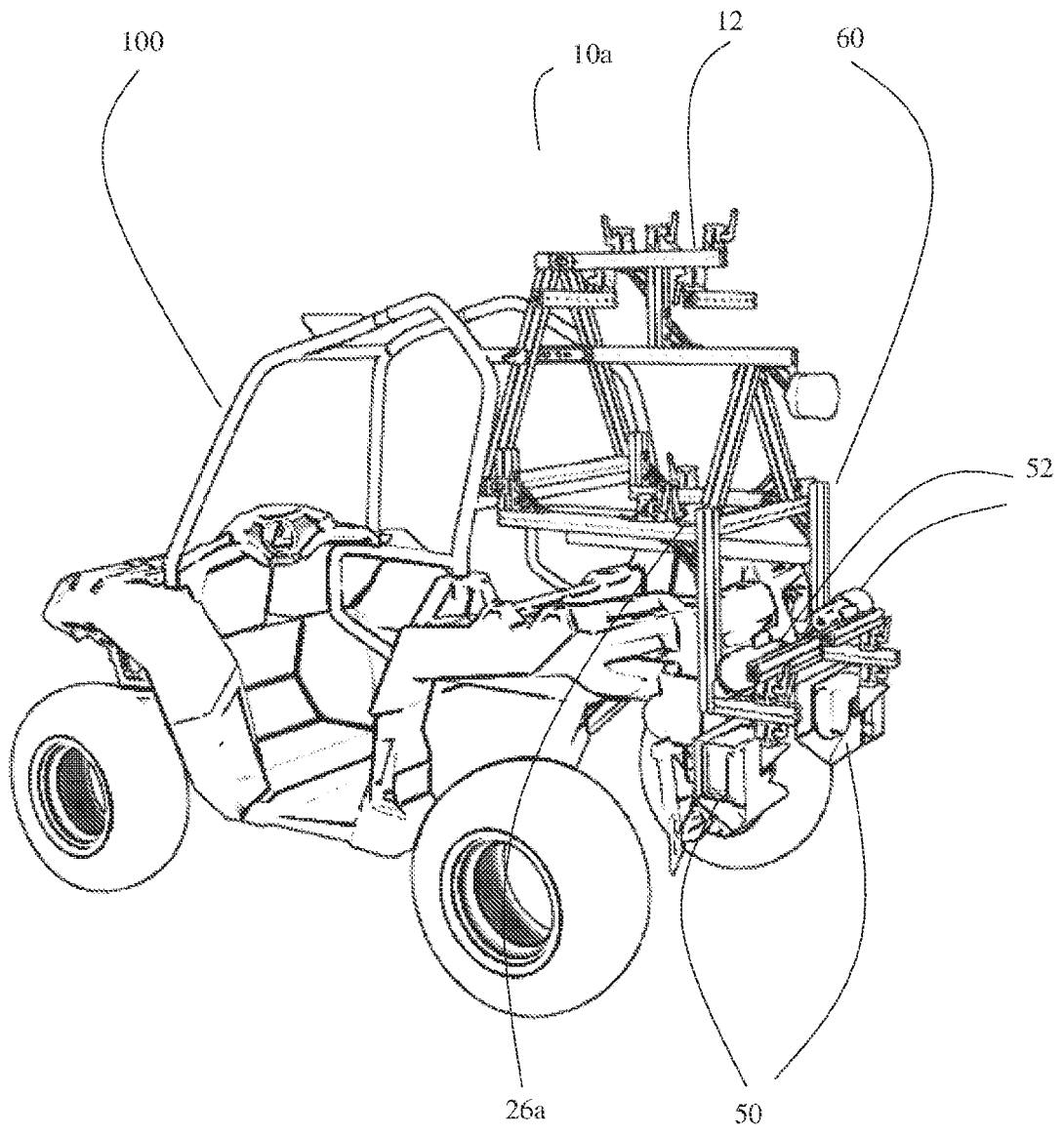

Referring now to the sequence of FIGS. 7 to 9 a modified
version of a carrier 10a is shown. In this version, a deploy-
able fold out frame extension 60 has been added to the frame
12. The frame extension 60 allows components to be
mounted very low to the ground for short crops such as
grape vines or overhead crops such as kiwi fruit. The
optional extension attaches to the back of the standard frame
12, and folds so that the overall dimensions of the ATV with
frame remain unchanged for transportation (e.g. on a stan-
dard trailer).

In FIG. 7, the frame extension 60 is shown folded for
transportation.

In FIG. 8, the frame extension 60 is shown partially
rotated from the transportation position shown in FIG. 7 to
the deployed position.

In FIG. 9, the frame extension is fully rotated to the
deployed position. The frame extension is attached to the
frame 12 by way of two pivotal type mountings 26a (iden-
tical in construction to mounting 26 which has been
described in relation in FIG. 1) which can be secured at any
desired degree of rotation a clamp lever. Two strobe light
modules 50 and two cameras 52 are carried on the frame
extension 60 for use very low to the ground.

The control system of the scanning arrangement adapts
the operation of the sensing equipment to suit the different
scanning scenarios. Different crops require different con-
figurations of the sensor 'settings' (e.g. the frame rate of the
cameras, or other parameters such as gain, etc) and different
data processing parameters (e.g. detecting apples versus
detecting almonds within images, and other processing
parameters relating to the particulars of the crop).

Several different software approaches are used to adapt
these settings to different crop types, including manual
selection; time and region based; and automatic detection. In
all cases, the sensor settings and processing configurations
for each crop are predetermined and stored in a list or lookup
table, which includes the appropriate sensing and processing
settings for a given a crop type (e.g. apples, almonds, etc)
and stage (e.g. flowers, fruitlets, fruit, etc) and details such
as the variety, tree age, tree spacing, row spacing, canopy
architecture, etc.

Manual Selection

The operator selects the crop type manually from the list,
and provides details such as those listed above. The corre-
sponding sensor settings and data processing configurations
are applied.

Time and Region Based

A database of crop locations is maintained, which specifies the spatial locations of crops and the corresponding metadata including details such as crop type, and the other parameters listed above. Another database stores the correspondence of the time of year to the crop stage for a given hemisphere (e.g. that apple flowering occurs in the southern hemisphere between August and October while mature apple fruit is on the tree in December to March). The time and location of the scanning system is known automatically due to its GNSS (GPS) sensor, and also stored with each dataset, and so this data can be used to look up the appropriate sensor and processing settings from the databases.

Automatic Detection

The type of crop (e.g. apples or almonds, etc) and stage (e.g. flowering or fruit, etc) can be determined automatically and directly from a sample of image data. The process relates closely to a core function of the Cartographer system, which is to process image data to detect features of interest pertaining to different crops, such as flowers or fruit.

Most Likely Hypothesis Method

This method samples/processes images according to every model for every possible crop type, and analyses the results to determine which model matches best. E.g. according to the maximum number of features (e.g. fruit or flowers) that are detected; according the quantities and distributions of those detections falling within pre-specified appropriate bounds for the crop, etc. The list of possible hypotheses may also be constrained using time and region information as per the "Time and region" section above. E.g. the time of data acquisition may rule out some but not all possible crop types, narrowing the search space for automatic detection. An advantage of this approach is that it re-uses the same component of the scanning system for detecting and mapping crops. A disadvantage is that it requires additional processing dependent on the number of hypotheses (possible crops).

Direct Detection Method

The direct detection method uses a machine vision classification system to directly output the most likely crop type, given a sample of images. This requires a classification system to be trained to recognise the crop types from sample images and must be retrained as new crop types are added to the list, but it is a simpler and more direct approach. As for the hypothesis method, the set of possible crops may optionally be constrained using time or spatial information.

In the scanning arrangements described above each setup used one camera for the left and one camera for the right side, achieving this with a wide angle fov lens. One lidar module is provided on the rear face of the frame which has a 360 fov, thus "seeing" both sides. Other embodiments could use a set of narrower cameras to achieve the wide field of view in combination (e.g. many smaller fovs adding to the same overall fov). In that configuration, the reconfigurable modular approach described herein would also have advantages, e.g. placing the "set" of cameras in different locations and orientations to achieve similar modularity and multi-crop reconfigurability.

It can be seen that embodiments of the invention have at least one of the following advantages:

1) Service providers can pay for and efficiently use one type of scanning system to service many of their customers with different crops.

2) The bill of materials is greatly simplified, allowing more efficient production of scanning platforms for use with multiple crop types Any reference to prior art contained herein is not to be taken as an admission that the information is common general knowledge, unless otherwise indicated.

Finally, it is to be appreciated that various alterations or additions may be made to the parts previously described without departing from the spirit or ambit of the present invention.

The invention claimed is:

1. A scanning system for scanning crops, the system being arranged to be mounted to a vehicle and to be traversed along rows of crops, the system including:

a carrier which is arranged to be mounted to a vehicle; and a number of mountings for attaching items of scanning equipment to the carrier;

wherein at least some of the mountings may be adjusted to allow the scanning system to be reconfigured for use in different scanning scenarios;

at least one of the mountings further includes an arm portion;

an item of scanning equipment is positionable at various locations along the length of the arm portion; and a control system, and wherein the control system adapts the operation of the sensing equipment to suit the different scanning scenarios.

2. The scanning system according to claim 1, wherein at least some of the mountings are pivotally adjustable.

3. The scanning system according to claim 1, wherein the arm portion is interchangeable with another arm portion of a different length.

4. The scanning system according to claim 1, wherein at least some of the mountings may be adjusted by moving them to different locations on the carrier.

5. The scanning system according to claim 1, wherein the carrier includes an extension portion and at least some of the mountings are provided on the extension portion.

6. The scanning system according to claim 5, wherein the extension portion is deployed by rotating it with respect to the remainder of the carrier.

7. The scanning system according to claim 5, wherein the extension portion is deployable to enable items of scanning equipment to be located low to the ground in use.

8. The scanning system according to claim 1, wherein the different scanning scenarios include different crop types.

9. The scanning system according to claim 1, wherein the different scanning scenarios include different features of interest.

10. The scanning system according to claim 1, wherein the control system automatically adapts the operation of the scanning equipment.

11. The scanning system according to claim 10, wherein the control system adapts the operation of the scanning equipment based on the geographic location of the scanning system.

12. The scanning system according to claim 10, wherein the control system adapts the operation of the scanning equipment based on the current time of year.

13. The scanning system according to claim 10, wherein the control system adapts the operation of the scanning equipment based on determining a crop type based on the output of one or more of the items of scanning equipment.

14. The scanning system according to claim 1, further including at least one item of scanning equipment which may be any one of a camera, a lighting unit, a global positioning device or a lidar.

* * * * *